(12) United States Patent
Park et al.

(10) Patent No.: US 7,714,820 B2
(45) Date of Patent: May 11, 2010

(54) CONTACT STRUCTURE OF CONDUCTIVE FILMS AND THIN FILM TRANSISTOR ARRAY PANEL INCLUDING THE SAME

(75) Inventors: Myung-Jae Park, Suwon-si (KR); Hyang-Shik Kong, Suwon-si (KR); Myung-Koo Hur, Anyang-si (KR); Jong-Woong Chang, Suwon-si (KR); Seong-Young Lee, Seoul (KR); Dong-Gyu Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 675 days.

(21) Appl. No.: 10/877,388

(22) Filed: Jun. 25, 2004

(65) Prior Publication Data

US 2005/0030465 A1  Feb. 10, 2005

(30) Foreign Application Priority Data

Jun. 27, 2003  (KR) ............... 10-2003-0042605
Jun. 27, 2003  (KR) ............... 10-2003-0042606

(51) Int. Cl.
*G09G 3/36*  (2006.01)

(52) U.S. Cl. ........................ 345/87; 349/149
(58) Field of Classification Search .............. 345/87; 349/149, 151, 152; 438/129, 149; 257/E21.37
See application file for complete search history.

(56) References Cited

U.S. PATENT DOCUMENTS

| | | | |
|---|---|---|---|
| 5,517,341 A | 5/1996 | Kim et al. | |
| 5,825,439 A * | 10/1998 | Noriyama | 349/54 |
| 5,835,170 A | 11/1998 | Fujiwara et al. | |
| 6,172,733 B1 * | 1/2001 | Hong et al. | 349/152 |
| 6,215,541 B1 * | 4/2001 | Song et al. | 349/141 |
| 6,225,969 B1 * | 5/2001 | Ishii | 345/100 |
| 6,297,519 B1 * | 10/2001 | Fujikawa et al. | 257/59 |
| 6,307,216 B1 | 10/2001 | Huh et al. | |
| 6,335,211 B1 * | 1/2002 | Lee | 438/22 |
| 6,524,876 B1 * | 2/2003 | Baek et al. | 438/48 |
| 6,683,593 B2 * | 1/2004 | Miyatake et al. | 345/92 |
| 2001/0040656 A1 * | 11/2001 | Na et al. | 349/110 |
| 2001/0046016 A1 * | 11/2001 | Park et al. | 349/139 |
| 2002/0036743 A1 * | 3/2002 | Youn et al. | 349/141 |
| 2002/0010979 A1 | 8/2002 | Chung et al. | |
| 2002/0109797 A1 | 8/2002 | Chung et al. | |
| 2004/0238825 A1 * | 12/2004 | Lim et al. | 257/79 |

(Continued)

FOREIGN PATENT DOCUMENTS

CN  1304055  7/2001

(Continued)

*Primary Examiner*—Abbas I Abdulselam
(74) *Attorney, Agent, or Firm*—Innovation Counsel LLP (57) ABSTRACT

A thin film transistor array panel is provided, which includes: a display cell array circuit including a plurality of gate lines, a plurality of data lines, a plurality of thin film transistors, and a plurality of pixel electrodes; a gate driving circuit supplying gate signals to the gate lines; and a signal line connected to the gate driving circuit and including first and second line segments separated from each other and a connection member connected to the first and second line segments through at least a contact hole exposing at least one of the first and the second line segments.

24 Claims, 7 Drawing Sheets

U.S. PATENT DOCUMENTS

2005/0134756 A1 * 6/2005 Yang et al. .................... 349/43

FOREIGN PATENT DOCUMENTS

| | | |
|---|---|---|
| CN | 1363920 | 8/2002 |
| CN | 1383214 | 12/2002 |
| JP | 03-142934 | 6/1991 |
| JP | 05-267636 | 10/1993 |
| JP | 10-161155 | 6/1998 |
| JP | 2000-199917 | 7/2000 |
| JP | 2001-125122 | 5/2001 |
| JP | 2001-160661 | 6/2001 |
| JP | 2001-174849 | 6/2001 |
| JP | 2003-121867 | 4/2003 |
| KR | 1020000016865 A | 3/2000 |
| KR | 1020020012754 A | 2/2002 |
| KR | 1020020066962 A | 8/2002 |
| KR | 1020020080559 A | 10/2002 |
| WO | 02-089177 A2 | 11/2002 |

* cited by examiner

CONTACT STRUCTURE OF CONDUCTIVE FILMS AND THIN FILM TRANSISTOR ARRAY PANEL INCLUDING THE SAME

BACKGROUND OF THE INVENTION (a) Field of the Invention

The present invention relates to a contact structure of conductive films and a thin film transistor array panels including the same.

(b) Description of Related Art

Recently, information processing devices are rapidly developed to have various shapes, various functions, increasing processing speeds. The information processed by the information processing devices has a form of electrical signals and a display device is required as an interface between the processed information and users such that the users' eyes can see the processed information.

A liquid crystal display (LCD) as a representative of flat panel displays are promising since they are light, small, low-power-consumptive, and pro-environmental compared with a cathode ray tube (CRT) and they can realize high resolution and full color display.

The LCD converts the change of optical properties such as birefringence, optical rotatory power, dichroism, and light scattering into the visual change, and the change of the optical properties is obtained by the change of orientations of liquid crystal molecules by varying electric field applied thereto.

The LCD is driven in an active matrix type or a passive matrix type, and the former is used for a twisted-nematic (TN) mode LCD, etc., while the latter is used for a super-twisted nematic (STN) LCD.

The active matrix type driving requires switching elements such as thin film transistors (TFTs) for separately driving pixels, while the passive matrix type driving does not, and thus the active matrix type driving is relatively complicated.

A TFT includes a semiconductor layer such as amorphous silicon or polysilicon. Although the LCD including the polysilicon TFTs has low power consumption and low product cost, the polysilicon TFTs are made by relatively complicated manufacturing processes compared with the amorphous silicon TFTs. Accordingly, the polysilicon TFT LCD is usually used in small devices such as IMT-2000 mobile phones.

The amorphous silicon TFT LCD can realize a large screen and high productivity, and thus it is usually used in large devices such as notebook personal computers, desktop computers, and high definition television sets (HDTV).

However, the amorphous silicon TFT LCD may include flexible printed circuit films mounting driving circuit chips and attached to a liquid crystal panel and printed circuit boards (PCBs). This configuration places the amorphous silicon TFT LCD to a disadvantageous position in the cost and the slimness, which spoils the advantage of high productivity of the amorphous silicon TFT LCD.

In the meantime, the TFT LCD includes a plurality of conductors disposed on different layers, and the conductors are electrically connected via connection members. The contact between the conductors and the connection members may distort or delay signals due to the corrosion or the disconnection of the conductors.

SUMMARY OF THE INVENTION

A motivation of the present invention is to solve the above-described problems of conventional LCDs.

A thin film transistor array panel is provided, which includes: a display cell array circuit including a plurality of gate lines, a plurality of data lines, a plurality of thin film transistors, and a plurality of pixel electrodes; a gate driving circuit supplying gate signals to the gate lines; and a signal line connected to the gate driving circuit and including first and second line segments separated from each other and a connection member connected to the first and second line segments through at least a contact hole exposing at least one of the first and the second line segments.

According to an embodiment of the present invention, the at least a contact hole has a petallike or serpentine boundary.

According to another embodiment of the present invention, edges of the first and the second line segments are toothed and engage with each other.

The first and second line segments may be disposed on different layers.

The thin film transistor array panel may further include: a first insulating layer formed on the first line segment, wherein the at least contact hole includes a first contact hole provided at the first insulating layer and exposing the first line segment at least in part.

The first contact hole may expose an edge of the first line segment, which may be is petallike or serpentine.

The first line segment may include a lower film and an upper film on the lower film. The lower film may include AL Al alloy, Ag or Ag alloy and the upper film may include Cr, Mo, Ti or Ta. The first contact hole preferably exposes the lower film of the first line segment.

The thin film transistor array panel may further include: a second insulating layer formed on the second line segment, wherein the at least a contact hole further includes a second contact hole provided at the first and the second insulating layer and exposing the second line segment at least in part and the connection member is formed on the second insulating layer and connected to the first and the second line segments through the first and the second contact holes, respectively.

The first line segment may include the same layer as the gate lines or the data lines. The connection member may include the same layer as the pixel electrodes or the gate lines or the data lines.

The gate driving circuit may include a shift register including a plurality of stages connected in sequence and the signal line transmits one of a plurality of clock signals having phase shifts, and a voltage.

The thin film transistor array panel may further include a data driving circuit supplying data signals to the data lines.

A contact structure of conductive films is provided, which includes: first and second conductive layers; an insulator formed on the first conductive layer and having a contact hole exposing the first conductive layer at least in part; and a connection member formed on the insulator and connected to the first conductive layer through the contact hole and to the second conductive layer, wherein an edge of at least one of the contact hole, the first conductive layer and the second conductive layer is petallike or serpentine.

The contact hole may expose an edge of the first conductive layer, and the exposed edge of the first conductive layer may be petallike or serpentine.

The first and the second line segments may have toothed edges engaging with each other.

The contact hole may further expose the second line segment at least in part.

BRIEF DESCRIPTION OF THE DRAWINGS

The present invention will become more apparent by describing embodiments thereof in detail with reference to the accompanying drawings in which.

DETAILED DESCRITPION OF EMBODIMENTS

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, thin film transistor (TFT) array panels liquid for LCDs according to embodiments of the present invention will be described with reference to the accompanying drawings.

Figure 1:
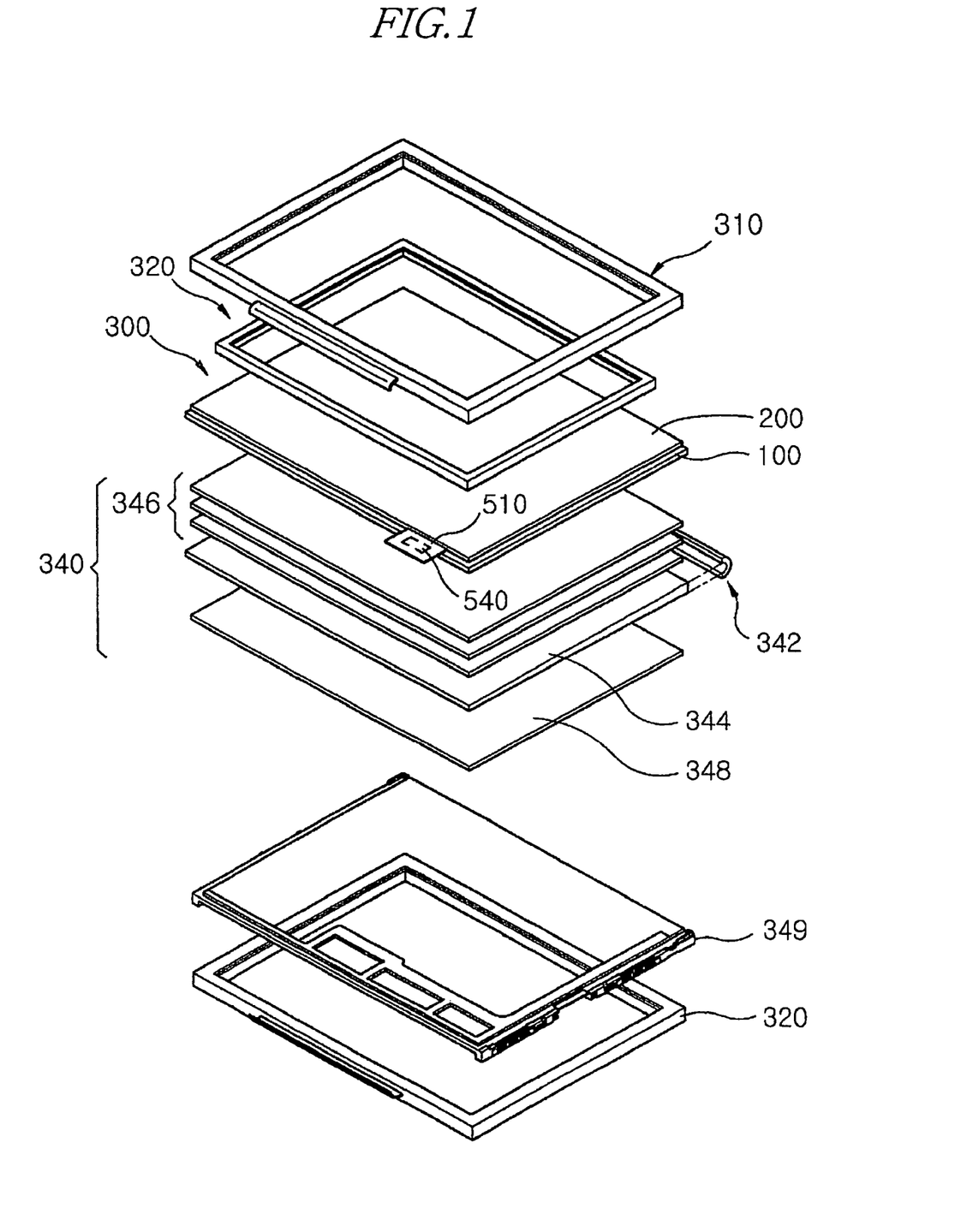
FIG. 1 is an exploded perspective view of an LCD according to an embodiment of the present invention.

FIG. 1 is an exploded perspective view of an LCD according to an embodiment of the present invention.

Referring to FIG. 1, an LCD according to an embodiment of the present invention includes a panel assembly 300, a backlight assembly 340, and a pair of covers 310 and 320.

The panel assembly 300 includes a pair of a TFT array panel 100 and a color filter panel 200, a liquid crystal layer (not shown) disposed between the panels 100 and 200, a flexible printed circuit (FPC) film 510 attached to the TFT array panel 100, and an integrated control and data driving chip 540 mounted on the FPC film 510.

The driving chip 540 mounted on the FPC film 510 and the circuits formed on the TFT array panel 100 are electrically connected via the FPC film 510. The FPC film 510 transmits data signals, timing signals, and driving voltages to the driving circuits on the TFT array panel 100.

The backlight assembly 340 includes a lamp assembly 342, a light guide 342 disposed under the panel assembly 300, a plurality of optical sheets 346 disposed between the panel assembly 300 and the light guide 342, a reflection sheet 348 disposed under the light guide 342, and a mold frame 349. The lamp assembly 342 is disposed near an edge of the light guide 342.

Figure 2:
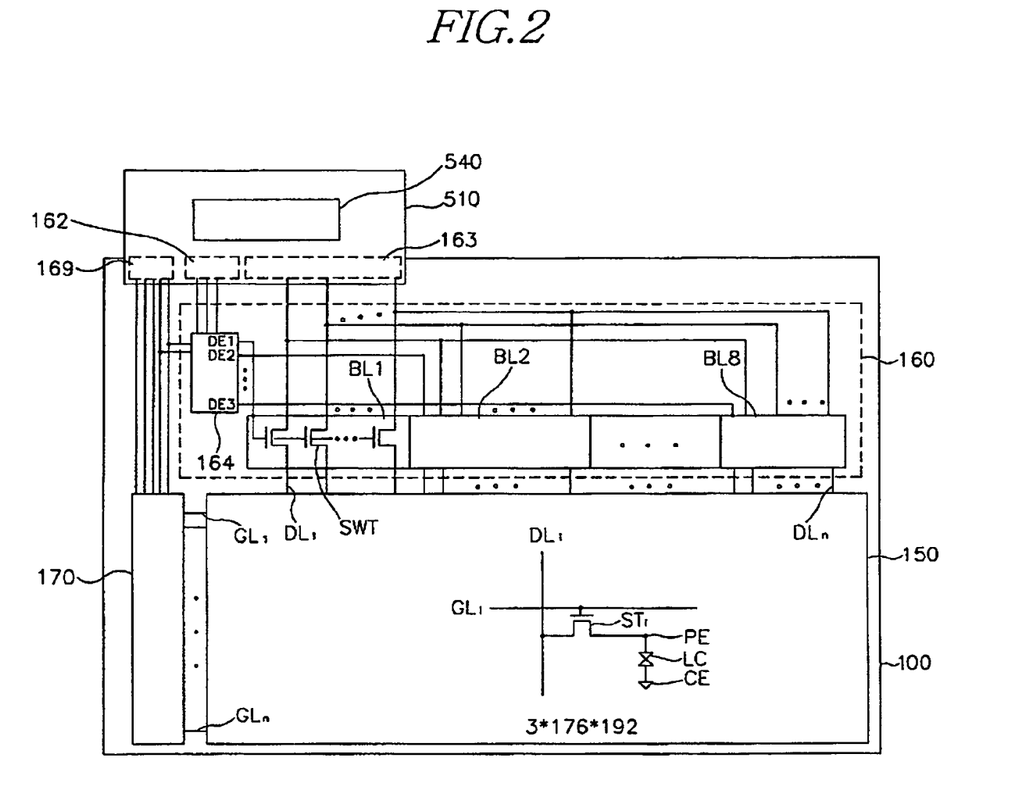
FIG. 2 is a block diagram of a panel assembly shown in FIG. 1 according to an embodiment of the present invention.

FIG. 2 is a schematic diagram of a panel assembly shown in FIG. 1 according to an embodiment of the present invention.

Referring to FIG. 2, a panel assembly 300 according to an embodiment of the present invention includes a display cell array circuit 150, a data driving circuit 160, a gate driving circuit 170, a pair of data connection terminal blocks 162 and 163, and a gate connection terminal 169 as well as a flexible printed circuit (FPC) film 510 and an integrated chip 540. The display cell array circuit 150 includes a plurality of gate lines GL1-GLn, a plurality of data lines DL1-DLm, a plurality of switching transistors STi, and a plurality of liquid crystal capacitors including pixel electrodes PB, a common electrode CE, and a liquid crystal layer LC. The display cell array circuit 150 may further include red, green and blue color filters disposed on pixels.

The gate lines GL1-GLn and the data lines DL1-DLm are disposed on the TFT array panel 100, and the gate lines GL1-GLn extend in a longitudinal direction, while and the data lines DL1-DLm. An exemplary 2" TFT array panel having a resolution of 176×192 includes 528 (i.e., 176×3)/192 data/gate lines.

The switching transistors STi are disposed near intersections of the gate lines GL1-GLn and the data lines DL1-DLm on the TFT array panel 100. Each of the switching transistors STi has a gate connected to a gate line GLi, a source connected to a data line DLi, and a drain connected to a pixel electrode PE.

The pixel electrodes PE are disposed on the TFT array panel 100, while the common electrode CE is disposed on the color filter panel 200. The liquid crystal layer (LC) is placed between the pixel electrodes PE and the common electrode CE, and orientations of liquid crystal molecules are controlled by voltages applied to the pixel electrodes PE and the common electrode CE to adjust transmittance of incident light, thereby displaying grays.

The driving circuits 160 and 170 and the connection terminal blocks 162, 163 and 169 are disposed on the TFT array panel 100.

The data driving circuit 160 includes a shift register 164 and a plurality of switching transistors SWT.

The number of the switching transistors SWT is equal to that of the data lines DL1-DLm, and for example, it is 528 in the above-described 2" LCD. 528 switching transistors SWT are grouped into eight switching transistor blocks BL1-BL8, each including 66 switching transistors SWT. Each of the blocks BL1-BL8 includes 66 input terminals connected to the connection terminal block 163, 66 output terminals connected to the data lines DL1-DLm, and a block selection terminal connected to the shift register 164. The connection terminal block 163 includes 66 data input terminals that are connected to the 66 input terminals of each switching transistor block BL1-BL8, respectively, and each of the input terminals of each block BL1-BL8 is connected to one of the input terminals of each of other blocks. Each of 528 switching transistors SWT is an a-Si TFT having a drain connected to a data line, a source connected to an input terminal, and a gate connected to the block selection terminal. Accordingly, 528 data lines DL1-DLm are grouped into eight groups depending on the connection to the switching transistor blocks BL1-BL8, each data line group including 66 data lines.

The shift register 164 has three input terminals connected to the data connection terminal block 162 for receiving a pair of voltages and a block selection signal, two input terminals connected to the gate connection terminal block 169 for receiving clock signals, and eight output terminals connected to the block selection terminals of the switching transistor blocks BL1-BL8, respectively.

An exemplary shift register is described in detail with reference to FIG. 3.

Figure 3:
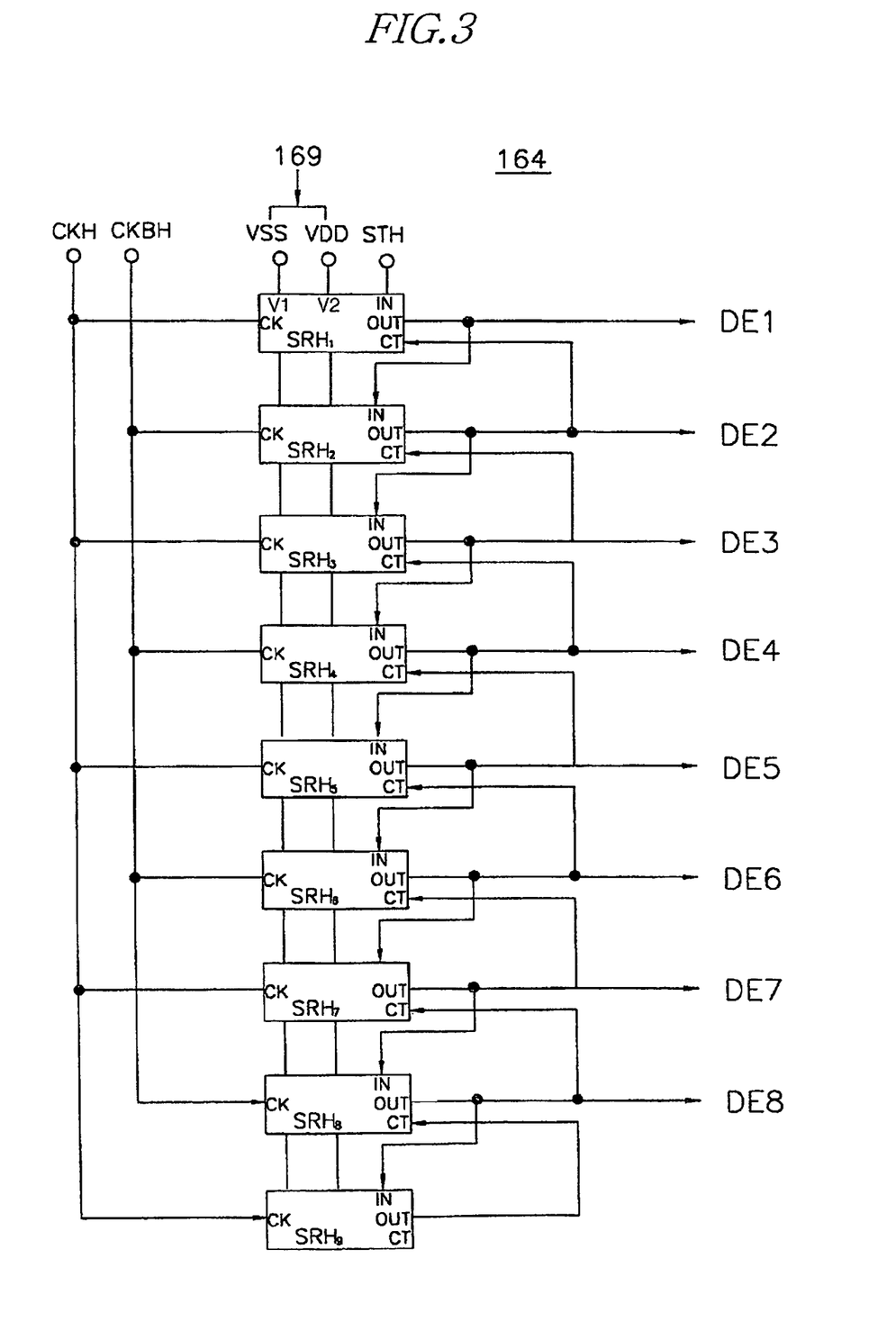
FIG. 3 is an exemplary block diagram of a shift register of the data driving circuit shown in FIG. 2.

FIG. 3 is an exemplary block diagram of a shift register of the data driving circuit shown in FIG. 2.

Referring to FIG. 3, a shift register 164 according to an embodiment of the present invention includes nine stages SRH1-SRH9 connected in sequence, i.e., first to eighth stages SRH1-SRH8 connected to the switching transistor blocks BL1-BL8, respectively, and a dummy stage SRH9.

Each stage SRH1-SRH9 has an input terminal IN, an output terminal OUT, a control terminal CT, a clock terminal CK, a first voltage terminal V1, and a second voltage terminal V2.

The input terminal IN of the first stage SRH1 is supplied with a block selection start signal STH, and the input terminal IN of each stage SRH2-SRH9 except for the first stage SRH1 is connected to the output terminal OUT of a previous stage SRH1-SRH8.

The clock terminal CK of each stage SRH1-SRH9 receives one of two clock signals CKH and CKHB having opposite phases. The odd stages SRH1, SRH3, SRH5, SRH7, and SRH9 are supplied with the first clock signal CHK, while the even stages SRC2, SRC4, SRH6, and SRH8 are supplied with the second clock CKHB. The first and the second clocks CKH and CKHB for the above-described 2" LCD may have a duty period smaller than about 1/66 ms.

The control terminal CT of each stage SRH1-SRH8 except for the dummy stage SRH9 are connected to the output terminal OUT of a next stage SRH2-SRH9.

The first and the second voltage terminals V1 and V2 receive first and second voltages VSS and VDD, and the first voltage VSS may have a level for turning off the switching transistors SWT, while the second voltage VDD may have a level for turning on the switching transistors SWT. Examples of the first and the second voltages are a ground voltage and a supply voltage, respectively.

The output terminal of each stage SRH1-SRH8 except for the dummy stage SRH9 is also connected to the block selection terminal of one of the switching transistor blocks BL1-BL8.

Each stage SRH1-SRH8 generates an output signal DE1-DE8 based on the received signals CKH, CKHB and DE1-DE8 and the received voltages VSS and VDD and supplies the output signal DE1-DE8 to the corresponding switching transistor block BL1-BL8 as a block selection signal for enabling the switching transistor block BL1-BL8. Each of the block selection signals DE1-DE8 has a high state for enabling a switching transistor block BL1-BL8 and a lower state for disabling the switching transistor block BL1-BL8, and the high states of the block selection signals DE1-DE8 are sequentially generated to sequentially activate the switching transistor blocks BL1-BL8.

The dummy stage SRH9 generates an output signal and provides the output signal for the previous, eighth stage SRH8.

Referring back to FIG. 2, the gate driver 170 is connected to the gate connection terminal block 169 and to the gate lines GL1-GL192.

An exemplary gate driver is described in detail with reference to FIG. 4.

Figure 4:
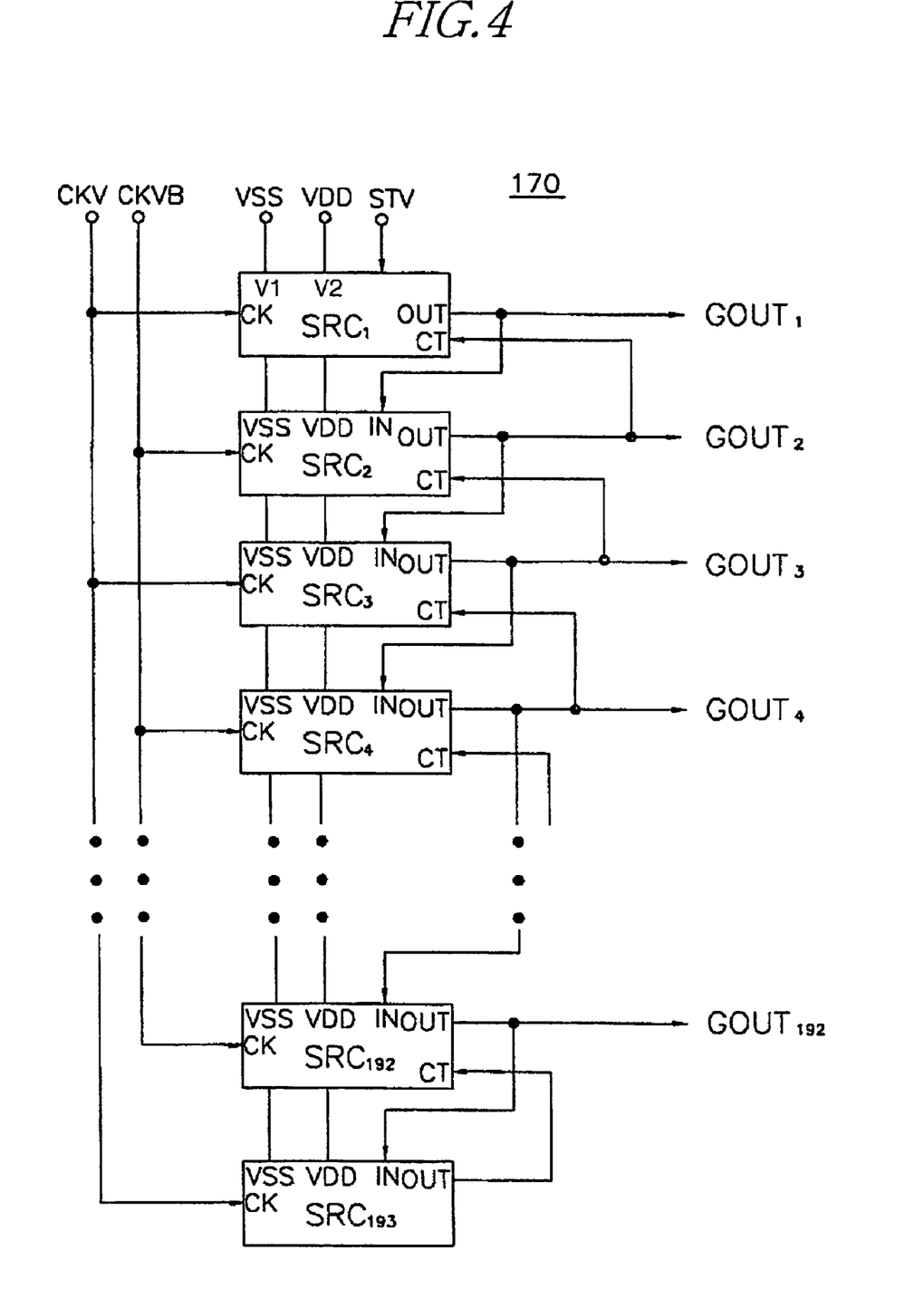
FIG. 4 is an exemplary block diagram of the gate driving circuit shown in FIG. 2.

FIG. 4 is an exemplary block diagram of the gate driving circuit shown in FIG. 2.

Referring to FIG. 4, a gate driver 170 according to an embodiment of the present invention is a shift register including a plurality of stages nine stages SRC1-SRC193 connected in sequence, i.e., first to 192-th stages SRC1-SRC192 connected to the gate lines GL1-GLn, respectively, and a dummy stage SRC193.

Each stage SRC1-SRC193 has an input terminal IN, an output terminal OUT, a control terminal CT, a clock terminal CK, a first voltage terminal V1, and a second voltage terminal V2.

The input terminal IN of the first stage SRC1 is supplied with a scan start signal STV, and the input terminal IN of each stage SRC2-SRC193 except for the first stage SRC1 is connected to the output terminal OUT of a previous stage SRC1-SRC192.

The clock terminal CK of each stage SRC1-SRC193 receives one of two clock signals CKV and CKVB having opposite phases. The odd stages SRC1, SRC3, . . . are supplied with the first clock signal CHK, while the even stages SRC2, SRC4, . . . are supplied with the second clock CKVB. The first and the second clocks CKV and CKVB for the above-described 2" LCD may have a duty period equal to about 16.6/192 ms.

The control terminal CT of each stage SRC1-SRC192 except for the dummy stage SRC193 are connected to the output terminal OUT of a next stage SRC2-SRC193.

The first and the second voltage terminals V1 and V2 receive first and second voltages VSS and VDD, and the first voltage VSS may have a level for turning off the switching transistors STi in the display cell array circuit 150, while the second voltage VDD may have a level for turning on the switching transistors STi. Examples of the first and the second voltages are a ground voltage and a supply voltage, respectively.

The output terminal of each stage SRC1-SRC192 except for the dummy stage SRC193 is also connected to one of the gate lines GL1-GLn.

Each stage SRC1-SRC192 generates an output signal GOUT1-GOUT192 based on the received signals CKV, CKVB and GOUT1-GOUT192 and the received voltages VSS and VDD and supplies the output signal GOUT1-GOUT192 to the corresponding gate line GL1-GLn as a gate signal. Each of the gate signals GOUT1-GOUT192 has a high state for turning on the switching transistors STi and a lower state for turning off the switching transistors STi, and the high states of the gate signals GOUT1-GOUT192 are sequentially generated to sequentially activate the switching transistors STi.

The dummy stage SRC193 generates an output signal and provides the output signal for the previous, 192-th stage SRC192.

Referring to FIGS. 1 and 4, a plurality of signal lines connected to the gate connection terminal block 169 for transmitting the first clock CKV, the second clock CKVB, the first voltage VSS, and the second voltage VDD as well as the stages SRC1-SRC192 are formed on the TFT array panel 100. The signal lines include line segments disposed on different layers with interposing an insulator and connecting members connecting them through contact holes provided at the insulator, which will be described in detail with reference to FIGS. 5-9.

Figure 5:
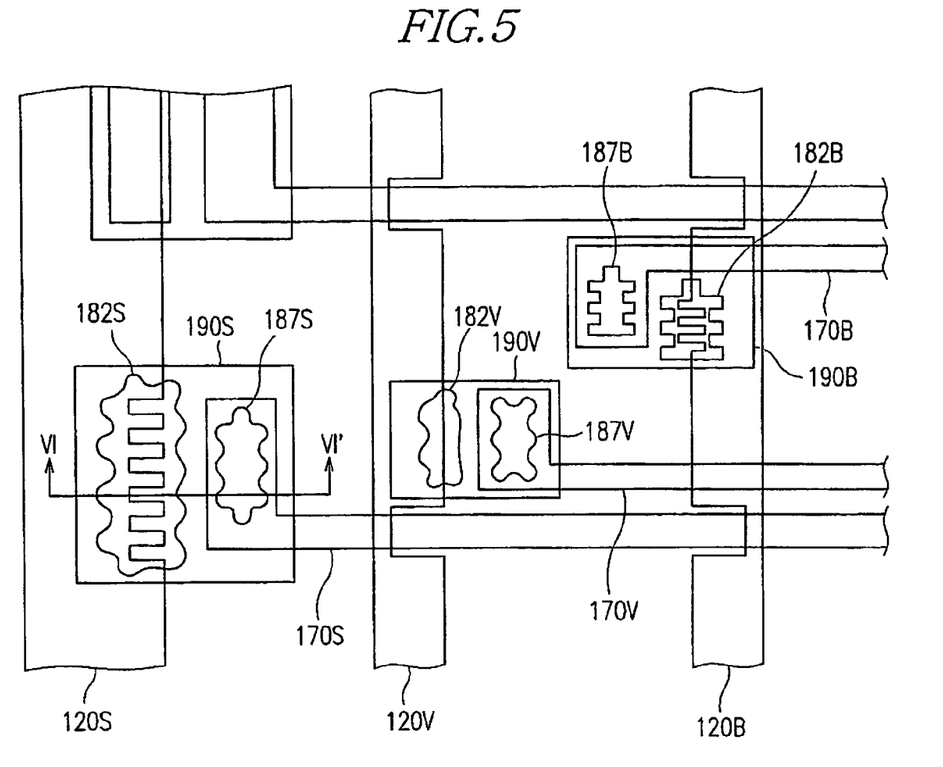
FIG. 5 is an exemplary layout view of signal lines for transmitting signals to the shift register shown in FIG. 4.
Figure 6:
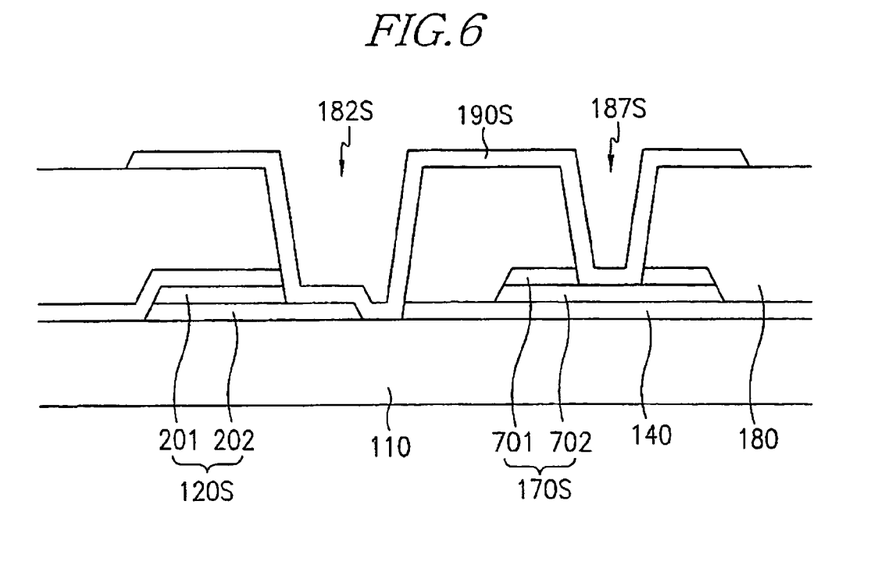
FIG. 6 is a sectional view of a signal line shown in FIG. 5 taken along the line VI-VI'.

FIG. 5 is an exemplary layout view of signal lines for transmitting signals to the shift register shown in FIG. 4, and FIG. 6 is a sectional view of a signal line shown in FIG. 5 taken along the line VI-VI'. For descriptive convenience, a signal line including elements 120S, 170S, 182S and 190S, which may be provided for transmitting the first voltage VSS, will be first described in detail.

Referring to FIGS. 5 and 6, a first line segment 120S is formed on an insulating substrate 110. The first line segment 120S includes a lower conductive film 201 preferably made of material such as Cr, Mo, Ta, Ti, or their alloys having good contact characteristic with other materials and an upper conductive film 202 preferably made of material such as Al, Ag, or their alloys having low resistivity.

A first insulating layer 140 preferably made of silicon nitride or silicon oxide is formed on the first line segment 120S and a second line segment 170S is formed on the first insulating layer 140. The second line segment 170S includes a lower conductive film 701 preferably made of material having good contact characteristic with other materials and an upper conductive film 702 preferably made of material having low resistivity.

A second insulating layer 180 preferably made of inorganic insulator such as silicon nitride or organic insulator having low permittivity is formed on the first insulating layer 140 and the second line segment 170S.

The first and the second insulating layers 140 and 180 have a contact hole 182S respectively exposing the first line segment 120S, and the second insulating layer 180 has a contact hole 187S exposing the second line segment 170S. Referring to FIG. 5, portions of the upper conductive films 202 and 702 of the first and the second line segments 120S and 170S in the contact holes 182S and 187S are removed to expose the lower conductive films 201 and 701. The contact holes 182S and 187S have sidewalls having smooth inclination angles such that overlying layers on the second insulating layer 180 have smooth profiles.

The contact holes 182S and 187S have sinuous or serpentine boundaries. The first contact hole 182S further exposes an edge of the first line segment 120S, which are serpentine or saw-toothed. The second contact hole 187S may also expose an edge of the second line segment 170S and the exposed edge of the second line segment 170S may be serpentine or saw-toothed. Such shapes of the contact holes 182S and 187S and the first line segment 120S increases areas and length of the exposed portions of the lower conductive films 201 and 701 of the first and the second line segments 120S and 170S and the contact holes 182S and 187S.

A connection member 190S, which contacts the first and the second line segments 120S and 170S through the contact holes 182S and 187S to electrically connect the first and the second line segments 120S and 170S, respectively, is formed on the second insulating layer 180.

The first and the second line segments 120S and 170S and the connection member 190S form a voltage signal line connecting the gate connection terminal block 169 and the first voltage terminal VSS.

In the meantime, the current flowing in the first and the second line segments 120S and 170S is equal to about 1.5 mA, which is ten times the current in the display cell array circuit (150 shown in FIG. 2). As described above, the petal-like or serpentine boundaries of the contact holes 182S and 187S and the first line segment (120S) increase the area of the exposed portions of the lower film 201 and 701 of the first and the second line segments 120S and 170S through the contact holes 182S and 187S to reduce the contact resistance between the first and the second line segments 120S and 170S and the connection member 190S. In addition, the petallike or serpentine boundaries elongate the boundaries of the exposed portions of the lower films 201 and 701 to prevent the disconnection between the first and the second line segments 120S and 170S and the connection member 190S, regardless of the high current.

Furthermore, the exposure of the boundaries of the first line segment 120S through the contact hole 182S prevents the disconnection of the connection member 190S at the contact hole 182S. In detail, portions of the connection member 190S near an edge of the contact hole 182S disposed on the first line segment 120S may be disconnected due to the undercut of the upper film 202 at the edge of the contact hole 182S. The undercut means that a portion of the upper films 202 under the first insulating layer 140 at the edge of the contact hole 182S is removed to place the boundary of the upper film 202 under the first insulating layer 140 such that the sidewall of the contact hole 182S has a hole or a depression. However, the other edge of the contact hole 182S disposed directly on the substrate 110 does not have such undercut. Accordingly, the connection member 190S contacts the first line segment 120S with a smooth profile, thereby securing the reliable contact therebetween.

As shown in FIG. 5, signal lines connected to the gate connection terminal block 169 including a signal line for transmitting the first clock CKV, which includes first and second line segments 120V and 170V and a connection member 190V connected thereto through contact holes 182V and 187V, and another signal line for transmitting the second clock signal CKVB, which includes first and second line segments 120B and 170B and a connection member 190B connected thereto through contact holes 182B and 187B, have substantially the same configuration as the above-described signal line including the line segments 120S and 170S and the connection member 190S.

The first line segments 120S, 102V and 120B may include the same layer as the gate lines GL1-GLm, while the second line segments 170S, 170V and 170B may include the same layer as the data lines DL1-DLm. In addition, the connection members 190S, 190V and 190B includes the same layer as the pixel electrodes PE and thus they are preferably made of transparent conductor such as ITO (indium tin oxide) and IZO (indium zinc oxide), or reflective conductor having low resistivity. When one of the first and the second line segments 120S, 102V, 120B, 170S, 170V and 170B is made of the same layer as the gate lines GL1-GLn or the data lines DL1-DLm, the connection members 190S, 190V and 190B may be made of the same layer as the data lines DL1-DLm or the gate lines GL1-GLm.

An a-Si film may be disposed under the first or the second line segments 120S, 102V, 120B, 170S, 170V or 170B if necessary.

Figure 7:
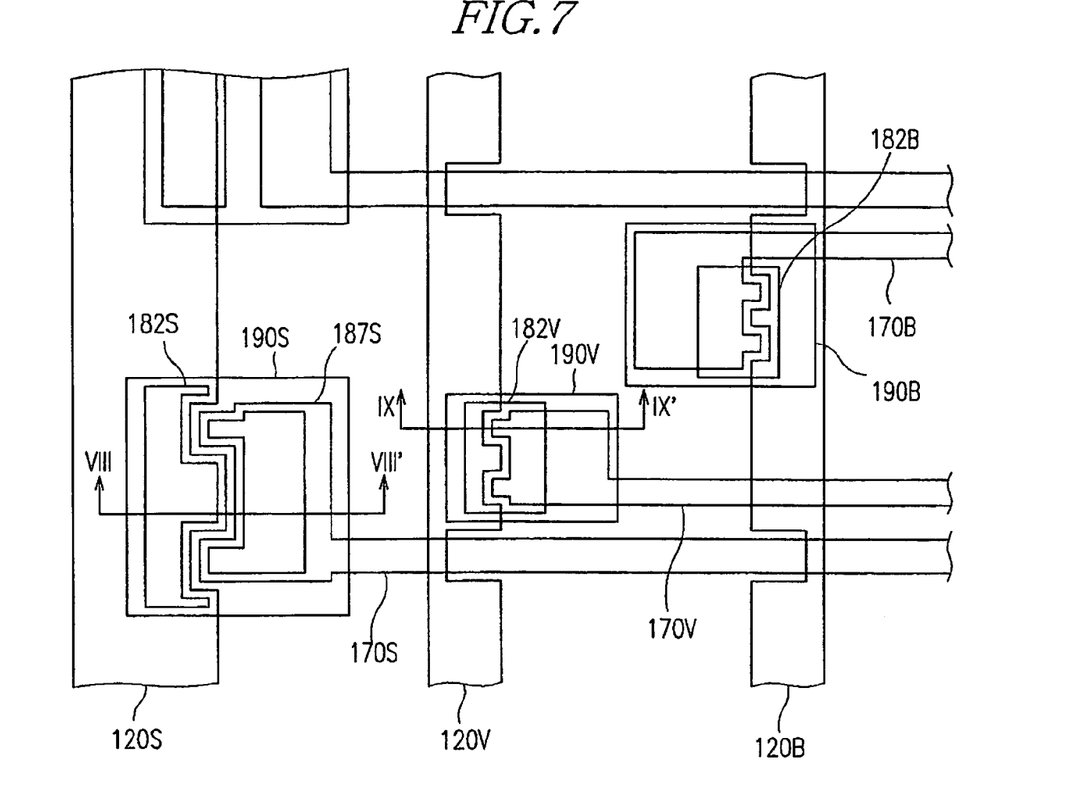
FIG. 7 is another exemplary layout view of signal lines for transmitting signals to the shift register shown in FIG. 4.
Figure 8:
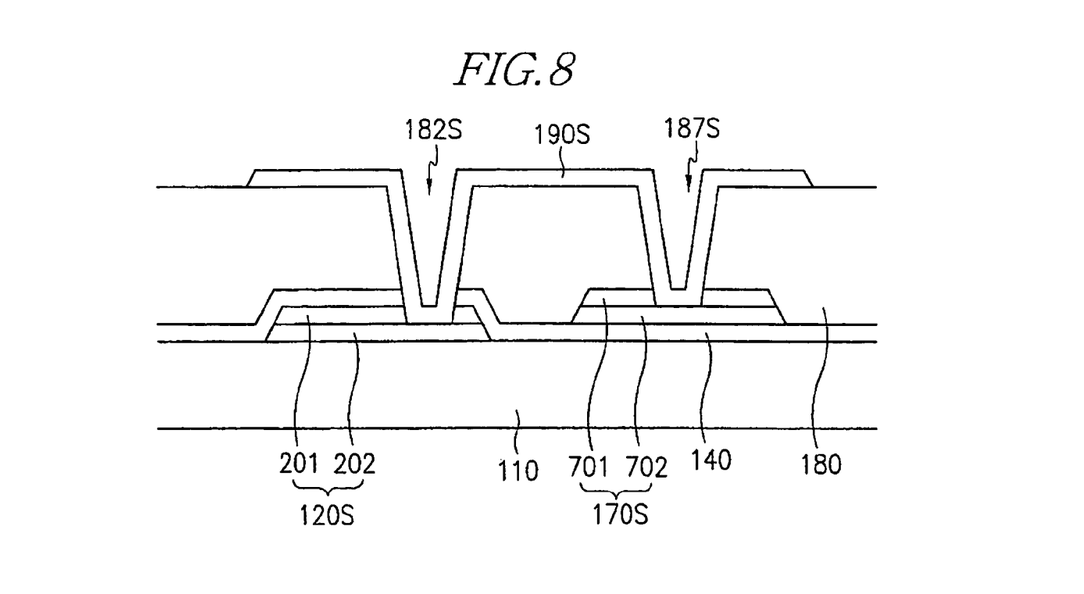
FIG. 8 is a sectional view of a signal line shown in FIG. 7 taken along the line VIII-VIII'.
Figure 9:
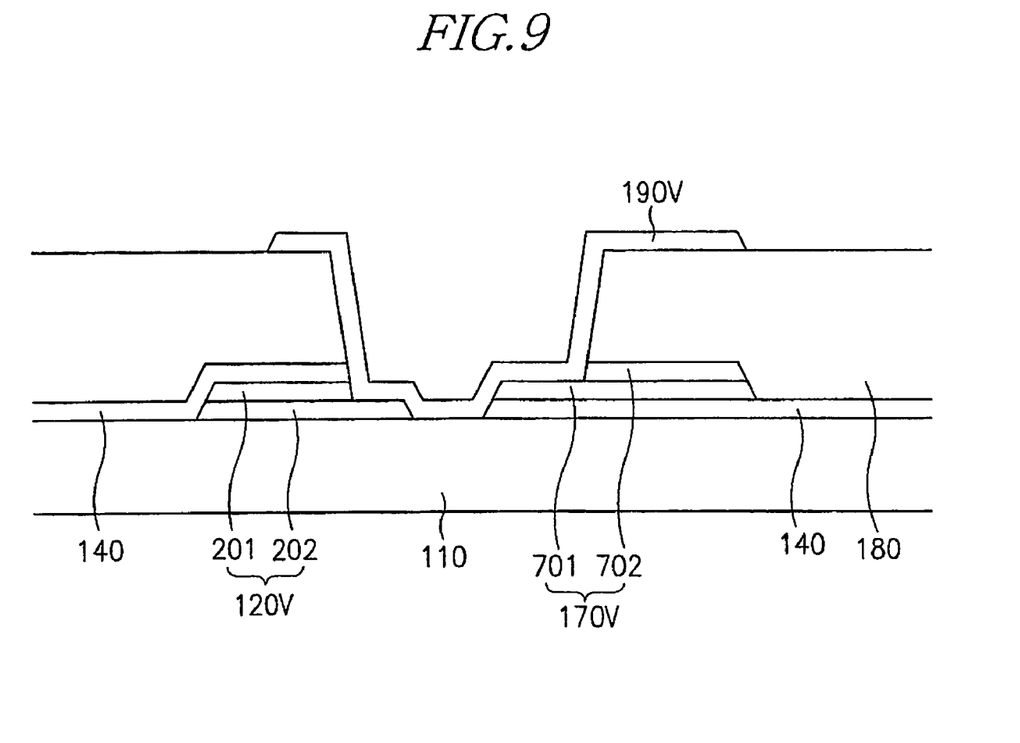
FIG. 9 is a sectional view of another signal line shown in FIG. 7 taken along the line IX-IX'.

FIG. 7 is another exemplary layout view of signal lines for transmitting signals to the shift register shown in FIG. 4, FIG. 8 is a sectional view of a signal line shown in FIG. 7 taken along the line VIII-VIII', and FIG. 9 is a sectional view of another signal line shown in FIG. 7 taken along the line IX-IX'.

Referring to FIGS. 7-9, a layered structure of signal lines according to this embodiment is substantially the same as that shown in FIGS. 5 and 6. That is, first line segments 120S, 120V and 120B is formed on an insulating substrate 110, and a first insulating layer 140 is formed on the first line segments 120S, 120V and 120B. Second line segments 170S, 170V and 170B are formed on the first gate insulating layer 140 and a second insulating layer 180 is formed on the second line segments 170S, 170V and 170B. The first and the second insulating layers 140 and 180 have a plurality of contact holes 182S, 182V, 182B and 187S, and connection members 190S, 190V and 190B are formed on the second insulating layer 180.

Different from the signal lines shown in FIGS. 5 and 6, adjacent edges of the first and the second line segments 120S and 170S; 120V and 170V; and 120B and 170B are toothed and close to each other to engage with each other with a predetermined distance. Accordingly, signal paths consisting of the connection members 190S, 190V and 190B become short. Since the connection members 190S, 190V and 190B may be made of the same layer as the pixel electrodes PE such as ITO or IZO, which has relatively high resistivity compared with metal, the shortening of the signal paths consisting of the connection members 190S, 190V and 190B reduces the distortion or the signal delay and prevent the disconnection of the signal lines. The predetermined distance between the adjacent edges of the first and the second line segments 120S and 170S; 120V and 170V; and 120B and 170B are preferably in a range about 2-10 microns.

Furthermore, the contact holes 182V and 182B expose both of the adjacent edges of the first and the second line segments 120V and 170V; and 120B and 170B, respectively. This configuration further reduces the signal paths consisting of the connection members 190V and 190B.

While the present invention has been described in detail with reference to the preferred embodiments, those skilled in the art will appreciate that various modifications and substitutions can be made thereto without departing from the spirit and scope of the present invention as set forth in the appended claims.

DESCRIPTION OF REFERENCE NUMERALS IN THE DRAWINGS 100, 200: panel
120S, 120V, 120B: first line segment
140, 180: insulating layer
150: display cell array circuit
160: data driver
162, 163, 169: connection terminal block
164: shift register
170: gate driver
170S, 170V, 170B: second line segment
182S, 182V, 182B, 187S, 187V, 187B: contact hole
190S, 190V, 190B: connection member
201, 701: lower film
202, 702: upper film
300: panel assembly
310, 320: cover
340: backlight unit
342: lamp unit
344: light guide
346: optical sheet
348: reflection sheet
349: mold frame
510: FPC film
540: chip

What is claimed is:

1. A thin film transistor array panel, comprising:
a display cell array circuit including a plurality of gate lines, a plurality of data lines, a plurality of thin film transistors, and a plurality of pixel electrodes;
a gate driving circuit supplying gate signals to the gate lines; and
a signal line connected to the gate driving circuit and including first and second line segments separated from each other;
a first insulating layer formed on the first line segment, the second line segment being formed on the first insulating layer;
a second insulating layer formed on the second line segment; and
a connection member formed on the second insulating layer and connected to the first and second line segments through at least a contact hole exposing at least one of the first and the second line segments,
wherein the contact hole has a toothed or sinuous boundary.

2. The thin film transistor array panel of claim 1, wherein the at least a contact hole includes a first contact hole extending though the first insulating layer and the second insulating layer and exposing the first line segment at least in part.

3. The thin film transistor array panel of claim 2, wherein the first contact hole exposes an edge of the first line segment.

4. The thin film transistor array panel of claim 3, wherein the exposed edge of the first line segment is a toothed edge.

5. The thin film transistor array panel of claim 2, wherein the first line segment includes a lower film and an upper film on the lower film.

6. The thin film transistor array panel of claim 5, wherein the upper film includes Al, Al alloy, Ag or Ag alloy and the lower film includes Cr, Mo, Ti or Ta.

7. The thin film transistor array panel of claim 6, wherein the first contact hole exposes the lower film of the first line segment.

8. The thin film transistor array panel of claim 2, further comprising:
a second contact hole provided in the second insulating layer and exposing the second line segment at least in part.

9. The thin film transistor array panel of claim 1, wherein the first line segment includes the same layer as the gate lines and the second line segment includes the same layer as the data lines.

10. The thin film transistor array panel of claim 1, wherein the connection member includes the same layer as the pixel electrodes.

11. The thin film transistor array panel of claim 1, wherein the gate driving circuit comprises a shift register including a plurality of stages connected in sequence and the signal line transmits to the gate driving circuit one of a plurality of clock signals having phase shifts, and a voltage.

12. The thin film transistor array panel of claim 1, further comprising a data driving circuit supplying data signals to the data lines.

13. A thin film transistor array panel, comprising:
a display cell array circuit including a plurality of gate lines, a plurality of data lines, a plurality of thin film transistors, and a plurality of pixel electrodes;
a gate driving circuit supplying gate signals to the gate lines; and
a signal line connected to the gate driving circuit and including first and second line segments separated from each other;
a first insulating layer formed on the first line segment, the second line segment being formed on the first insulating layer;
a second insulating layer formed on the second line segment; and
a connection member formed on the second insulating layer and connected to the first and second line segments through at least a contact hole exposing at least one of the first and the second line segments,
wherein at least portions of edges of the first and the second line segments are toothed and engage with each other.

14. The thin film transistor array panel of claim 13, wherein the at least a contact hole includes a first contact hole exposing the first line segment at least in part.

15. The thin film transistor array panel of claim 14, wherein the first contact hole exposes an edge of the first line segment.

16. The thin film transistor array panel of claim 14, wherein the first contact hole further exposes the second line segment at least in part.

17. The thin film transistor array panel of claim 14, wherein the at least a contact hole further includes a second contact hole exposing the second line segment at least in part.

18. The thin film transistor array panel of claim 13, wherein the first line segment includes the same layer as the gate lines and the second line segment includes the same layer as the data lines.

19. The thin film transistor array panel of claim 13, wherein the connection member includes the same layer as the pixel electrodes.

20. A contact structure of conductive films, the contact structure comprising:
- first and second conductive layers;
- a first insulating layer formed on the first conductive layer, the second conductive layer being formed on the first insulating layer;
- a second insulating layer formed on the second conductive layer;
- a contact hole exposing a portion of the first conductive layer and a portion of the second conductive layer; and
- a connection member formed on the second insulating layer and connected to the first conductive layer and the second conductive layer through the contact hole,
- wherein at least a portion of an edge of at least one of the contact hole, the first conductive layer and the second conductive layer is serpentine, toothed or sinuous.

21. The contact structure of claim 20, wherein the contact hole exposes an edge of the first conductive layer.

22. The contact structure of claim 21, wherein the exposed edge of the first conductive layer is toothed.

23. The contact structure of claim 20, wherein the first and the second conductive layers have toothed edges engaging with each other.

24. The contact structure of claim 21, wherein the contact hole further exposes the second conductive layer at least in part.

* * * * *